United States Patent [19]

Kasuga et al.

[11] Patent Number: 4,533,680

[45] Date of Patent: Aug. 6, 1985

[54] THERMOPLASTIC RESIN COMPOSITION FOR MOLDING

[75] Inventors: Takuzo Kasuga, Tokyo; Katsuhiko Takahashi, Fuji, both of Japan

[73] Assignee: Polyplastic Company, Ltd., Osaka, Japan

[21] Appl. No.: 598,651

[22] Filed: Apr. 10, 1984

[30] Foreign Application Priority Data

Apr. 13, 1983 [JP] Japan .................................. 58-64800

[51] Int. Cl.$^3$ ........................... C08K 3/40; C08K 3/34; C08K 3/04
[52] U.S. Cl. ................................ 523/220; 524/449; 524/451; 524/494; 524/496; 524/537
[58] Field of Search ......................... 523/220; 524/537

[56] References Cited

U.S. PATENT DOCUMENTS

| | | | |
|---|---|---|---|
| 4,056,504 | 11/1977 | Grundmeier et al. | 524/537 |
| 4,123,415 | 10/1978 | Wambach | 524/537 |
| 4,195,011 | 3/1980 | Gasman et al. | 523/220 |
| 4,352,907 | 10/1982 | Lee | 524/537 |
| 4,460,735 | 7/1984 | Froix | 524/537 |

FOREIGN PATENT DOCUMENTS

| | | | |
|---|---|---|---|
| 2611905 | 9/1977 | Fed. Rep. of Germany | 523/220 |
| 57-14643 | 1/1982 | Japan | 523/220 |
| 57-16055 | 1/1982 | Japan | 523/220 |

*Primary Examiner*—Lewis T. Jacobs
*Attorney, Agent, or Firm*—Andrew F. Sayko, Jr.

[57] ABSTRACT

A thermoplastic resin composition comprises a crystalline thermoplastic resin, a reinforcing fiber, a flaky filler and polycarbonate and is suitable for molding.

16 Claims, No Drawings

THERMOPLASTIC RESIN COMPOSITION FOR MOLDING

This invention relates to a thermoplastic resin composition which is low in deformation degree when molded and has excellent mechanical properties, in particular, impact resistance.

Though crystalline thermoplastic resins are generally used per se as engineering plastics to be molded into machine parts for various purposes, they are used in the form of a composition containing reinforcing material such as glass fiber in the field requiring high mechanical strength or rigidity. However, a composition containing a reinforcing fiber such as glass fiber is remarkably anisotropic in general and has a drawback of causing deformation of moldings during molding or annealing, though it has high mechanical strength and rigidity. Such deformation is particularly significant in resins of high crystallization degree, such as polyacetal and polybutylene terephthalate, or those of which crystallization is facilitated by annealing, such as polyethylene terephthalate. Therefore, applicability of these resins as molding materials must be judged mainly on the basis of the balance between mechanical properties such as impact resistance or rigidity and deformation, in addition to chemical and thermal properties according to the purpose of use of the compound, and this balance is particularly important when the resin is used as material for moldings of which dimensional accuracy is required, for example, substrate and cases. It is extremely difficult to improve mechanical properties such as rigidity or impact resistance of moldings while suppressing the deformation thereof and, particularly, in the case of crystalline thermoplastic resin, the manufacture of products having a high dimensional accuracy is nearly impossible.

The Australian patent No. 522 577 issued on June 17, 1982 discloses a composition which comprises a thermoplastic resin, reinforcing fibers and flaky fillers and teaches that the composition is fairly satisfactory. But the disclosed composition is not yet sufficient when it is used for molding.

This invention has been completed on the basis of a finding that addition of polycarbonate to resin material is remarkably effective for reducing the deformation degree as well as for improving mechanical properties of the products as a result of examination in various ways to obtain a thermoplastic resin composition having a low deformation degree and excellent mechanical properties, particularly, static strength, rigidity, impact resistance or the like.

In other words, this invention is related with a thermoplastic resin composition characterized in that a reinforcing fiber, a flaky filler, and polycarbonate are incorporated in a crystalline thermoplastic resin.

The crystalline thermoplastic resin used in this invention is an organic high molecular substance which has a crystalline structure at least partly in a solid state, such as, polyacetal (homo- or copolymer); polyalkylene terephthalate, e.g., polybutylene terephthalate, polypropylene terephthalate, or polyethylene terephthalate, and copolymers or mixtures thereof; or various polyamides. These crystalline resins are per se suitable for functional parts in respect of chemical and thermal properties, but often short of sufficiency when used as molding materials, of which both mechanical strength and dimensional accuracy are important factors, owing to a large degree of deformation during molding or annealing. However, a composition containing additional constituents as described below was found to exhibit particularly high effects and provide a satisfactory function for the purpose.

The reinforcing fiber used in this invention includes inorganic fibers such as glass fiber, carbon fiber, graphite fiber, metallic fiber, silicon carbide fiber, asbestos, wollastonite or fibrous potassium titanate, whiskers, and various organic fibers. A reinforcing material is preferably glass fiber, but is not limited thereto and various materials are used in various ways according to the purpose such as reinforcement of mechanical properties, imparting of electric conductivity, improvement in frictional characteristics, or increase in flame resistance. These reinforcing fibers may be used alone or as a mixture thereof. According to this invention, a length/diameter ratio of reinforcing fibers to be incorporated in the resin is within a range preferably from 5 to 1,000, in particular, from 10 to 100. For example, a glass fiber with a diameter of about $10\mu$ must have preferably an average length ranging from approximately 100 to $1,000\mu$. Excessively long fibers degrade moldability of the composition to be produced and, therefore, the staple length is preferably not larger than 1 mm. The quantity of the reinforcing fiber to be added ranges from 1 to 60% by weight of the total quantity of the resin composition, being appropriately determined according to the use, and particularly desirably 2 to 30%.

The flaky filler used in this invention includes mica (muscovite, phlogopite, sericite, etc.), glass flake, talc, metallic foil, and so on, among which particularly desirable is glass flake. A proportion of flaky fillers to be added ranges from 1 to 59% by weight of the total quantity of the resin composition, particularly desirably from 2 to 40% by weight. These flaky fillers may be used each alone or as a mixture thereof. Addition of flaky substances is effective for preventing deformation of the composition even when used alone, but is more effective when used in combination with fibrous additives for maintaining high mechanical properties, particularly, tensile strength and impact resistance as well as possessing high dimensional accuracy and low warpage as disclosed in the above introduced Australian patent No. 522 577. However, since an excessive quantity of additives degrades moldability of the resin composition, a practical upper limit of the total quantity of the flaky and fibrous additives is 60% by weight of the composition, preferably 30 to 50%. To reduce the deformation degree of moldings, the diameter (an average length in the direction of spreading) of the flaky substance is preferably $40\mu$ or longer and the thickness thereof from 0.1 to $10\mu$, particularly desirably from 1 to $5\mu$. The diameter/thickness ratio is desirably 4 or above, more desirably 30 or above and most desirably from 30 to 400. Flaky substances which are low in diameters or diameter/thickness ratios exhibit a deformation preventive effect to a low degree only, whereas those which are too high tend to undesirably degrade moldability of the composition. Above all, as regards glass flakes, thicknesses thereof range preferably from 2 to $5\mu$ and diameters (lengths in the direction of spreading) preferably exceed $40\mu$, particularly desirably from 100 to $1,000\mu$ in average.

Though these flaky fillers and reinforcing fibers may be incorporated without any particular treatment, they are capable of increasing the mechanical strength further when used after their surfaces have been treated with an appropriate surface-treating agent to improve affinity and adhesiveness to synthetic resins. As surface-treating agents, various kinds of known ones may be used in this invention, and there can be mentioned, for example, silanes, titanates, and epoxy compounds.

A characteristic of this invention is that polycarbonate is incorporated therein, which provides synergistic effects for preventing deformation and warpage of the composition composed of crystalline thermoplastic resin to which reinforcing fibers and flaky fillers are added, as well as for improving the mechanical properties of said composition. Polycarbonate used in this invention is of a bisphenol type and obtained, for example, by the reaction of a bisphenol with a carbonate or with phosgene in the presence of an alkali. This polycarbonate is desired to have a high degree of fluidity and a quantity thereof to be added is preferably within the range from 1 to 50% by weight of the total quantity of the resin composition, preferably from 2 to 25%, because addition of too large a quantity of polycarbonate degrades heat-resistance of the composition.

A composition according to this invention is easily prepared by conventional methods of preparing reinforced resins or filler-containing resins. Any of the following methods is applicable, for example: a first method in which pellets to be used in this invention are prepared by mixing and extruding various additives using an extruder and then molded; a second method in which pellets containing different constituents from each other are blended together prior to molding and a composition containing constituents according to this invention is obtained after molding; and a third method in which every constituent is directly fed into the molding machine.

A composition according to this invention can be used after having organic high molecular substances other than the aforesaid components added thereto for adjusting or modifying physical properties thereof according to the field of use of this composition. Included among organic high molecular substances are polyolefins and copolymers mainly consisting thereof, such as polyethylene, polypropylene, polybutene-1, polybutene-2, poly-4-methylpentene-1, ethylene/propylene copolymer, ethylene/butene copolymer, and ethylene/4-methylpentene-1 copolymer; ethylene/carboxylate ester copolymers and metallic salts thereof, such as ethylene/vinyl acetate copolymer, ethylene/alkyl acrylate copolymer, and the sodium salt of ethylene/methacrylic acid copolymer; vinyl polymers and copolymers, such as polystyrene, styrene/butadiene/acrylonitrile copolymer, styrene/acrylonitrile copolymer, and methyl methacrylate/styrene copolymer; rubber-like high molecular substances such as polybutadiene and butyl rubber; as well as a modifier comprising polyacrylate resin, and a modifier comprising segment type thermoplastic copolyester. The modifier comprising segment type thermoplastic copolyester is one in which the polyacrylate resin contains a unit derived from $C_1$–$C_6$ alkyl acrylates, and the polyacrylate comprises a multistage copolymer having a rubber-like first stage and a final thermoplastic hard stage. A preferred multi-stage copolymer is, for example, butyl acrylate/butylene diacrylate/allyl methacylate. The modifier comprising a segment type thermoplastic copolyester comprises a large number of repeating long-chain and short-chain ester units which are connected with each other through a head-to-tail bonding, the long-chain ester unit being represented by the following formula:

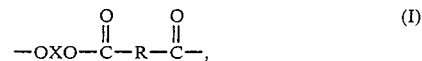

and the short-chain one by the following formula:

In formulae (I) and (II), X represents a bivalent residue obtained by removing terminal hydroxy groups from polyalkylene oxide glycol having a melting point of not higher than about 60° C., a molecular weight of about from 400 to 4,000, and a carbon/oxygen ratio of from about 2.5 to 4.3; R represents a bivalent residue obtained by removing carboxyl groups from a dicarboxylic acid having a molecular weight of not larger than about 300; and Y denotes a bivalent residue obtained by removing hydroxyl groups from a diol having a molecular weight of not larger than about 250. These organic high molecular substances can be used each alone or as a mixture of two or more of them according to the purpose. A quantity of these substances to be added may be set within a limit not exceeding 50% by weight of the crystalline thermoplastic resin, preferably from 5 to 40%. A composition according to this invention may be endowed with required properties according to the purpose of use by addition of known antistatic agents, coloring agents, lubricants, mold release agents, nucleating agents, stabilizers, fire-resistant agents, or surfactants.

Utility of this invention will now be described by way of examples of polybutylene terephthalate resin for which this invention is particularly useful, though this invention is not limited thereto.

EXAMPLES 1 TO 7, COMPARATIVE EXAMPLES 1 TO 8

A composition was prepared by mixing polybutylene terephthalate (Duranex made by Polyplastics Co., Ltd.) with glass fibers, glass flakes (average diameter of 600μ), and polycarbonate at the rate as shown in Table 1, and extruding the mixture into pellets by means of a 40 m/m uniaxial extruder. Then, test pieces were molded of said pellets by a molding machine for measurement of deformation degree, tensile strength, and impact resistance. On the other hand, other examples for comparison which are devoid of polycarbonate or of any one of glass fiber and glass flake were measured with respect to the same items as above. Results of these measurements are shown in Table 1. For measurement of the deformation degrees, flat test pieces, 120 mm square (2 mm thick), were prepared and the most severely deformed part of the test piece was measured as a representative of the deformation degree.

TABLE 1

| | Glass fiber | Glass flake | Poly-carbonate | Polybutylene tere-phthalate | Deformation degree mm | Tensile strength | Izod (notched) kg · cm/cm |
|---|---|---|---|---|---|---|---|
| Example | | | | | | | |
| 1 | 5 | 35 | 10 | 50 | 0.2 | 902 | 2.9 |
| 2 | 10 | 30 | 10 | 50 | 0.5 | 1003 | 3.7 |
| 3 | 20 | 20 | 10 | 50 | 1.7 | 1210 | 6.5 |
| 4 | 20 | 20 | 10 | 50*1 | 1.8 | 1069 | 8.5 |
| 5 | 20 | 20 | 10 | 50*2 | 1.9 | 1175 | 9.6 |
| 6 | 20 | 20 | 10 | 50*3 | 1.9 | 1157 | 8.6 |
| 7 | 30 | 10 | 10 | 50 | 7.2 | 1402 | 8.0 |
| Comparative Example | | | | | | | |
| 1 | 0 | 40 | | 60 | 0.2 | 743 | 2.1 |
| 2 | 5 | 35 | | 60 | 0.4 | 815 | 2.9 |
| 3 | 10 | 30 | | 60 | 0.7 | 931 | 3.2 |
| 4 | 20 | 20 | | 60 | 13.6 | 1018 | 5.8 |
| 5 | 30 | 10 | | 60 | 25.3 | 1311 | 7.22 |
| 6 | 40 | 0 | | 60 | 25.7 | 1422 | 9.3 |
| 7 | 0 | 40 | 10 | 50 | 0.2 | 790 | 2.6 |
| 8 | 40 | 0 | 10 | 50 | 20.5 | 1543 | 9.7 |

The quantity is denoted in terms of percent by weight against the total quantity of the composition.
Remarks:
*1 Polybutylene terephthalate (45% by weight) and ethylene/ethyl acrylate copolymer (5% by weight)
*2 Polybutylene terephthalate (45% by weight) and a modifier comprising polyacrylate resin (5% by weight) (Acryloid KM330: made by Rohm and Haas Co.)
*3 Polybutylene terephthalate (45% by weight) and a segment type copolyester (5% by weight) (Hytrel: made by Du Pont)

Among the above examples, those using resins to which specific high molecular substances were added, such as Nos. 4 through 6, were able to give moldings which are low in the deformation degree and have an increased impact resistance. By using these resins, high impact resistance can be obtained even if the quantity of glass fibers to be added is reduced, so that a further advantage of attaining reduction in the deformation degree is obtained.

EXAMPLES 8 AND 9 AND COMPARATIVE EXAMPLES 9 AND 10

For comparison between physical properties differing due to difference in average diameters, results of evaluation using the same composition as that of Example 3 are shown in Table 2. In addition, results of evaluation of the composition to which glass beads (average diameter of 30μ) instead of glass flakes were added in the same quantity as that of the latter is shown.

TABLE 2

| | Average diameter, μ | Length/Thickness ratio | Additives | Deformation degree, mm |
|---|---|---|---|---|
| Example | | | | |
| 8 | 600 | 200 | glass flake | 1.7 |
| 9 | 100 | 50 | glass flake | 1.5 |
| Comparative Example | | | | |
| 9 | 30 | 10 | glass lumps | 11.3 |
| 10 | 30 | 1 | glass bead | 13.5 |

The embodiments of the invention in which an exclusive property or privilege is claimed are defined as follows:

1. A thermoplastic resin composition having reduced deformation degree and improved impact resistance when molded which comprises a crystalline thermoplastic resin and
   (a) a reinforcing fiber having a staple length not greater than about 1μ and a ratio of length to diameter in the range of from about 5 to about 1000, said fiber being present in a concentration in the range of from about 1 to about 60 weight percent;
   (b) a flaky filler having an average diameter in the range of from about 100 to about 1000μ, an average thickness in the range of from about 0.1 to about 10μ and a diameter/thickness ratio in the range of from about 4 to 400, said filler being present in a concentration in the range of from about 1 to about 50 weight percent; and
   (c) a polycarbonate in a concentration in the range of from about 1 to about 50 weight percent,
all based on the total quantity of the resin composition.

2. A thermoplastic resin composition as claimed in claim 1 wherein the total content of said reinforcing fiber and said flaky filler is not more than 60 weight percent.

3. A thermoplastic resin composition as claimed in claim 1 or 2, wherein said reinforcing fiber is present in a concentration of from about 2 to about 30 weight percent.

4. A thermoplastic resin composition as claimed in claims 1 or 2, wherein said flaky filler is present in a concentration of from about 2 to about 40 weight percent.

5. A thermoplastic resin composition as claimed in claim 2, wherein the total content of said reinforcing fiber and said flaky filler is in the range of from about 30 to about 50 weight percent.

6. A thermoplastic resin composition as claimed in claims 1 or 2, wherein said polycarbonate is present in a concentration of from about 2 to about 25 weight percent.

7. A thermoplastic resin composition as claimed in claim 1, wherein said thermoplastic crystalline resin is blended with an organic high molecular substance other than a crystalline resin in a concentration of from about 5 to about 40 weight percent of said crystalline thermoplastic resin.

8. A thermoplastic resin composition as claimed in claim 7, wherein said organic high molecular substance is a vinyl polymer or copolymer.

9. A thermoplastic resin composition comprising a crystalline thermoplastic resin component comprising a polybutylene terephthalate resin and:
(a) a reinforcing glass fiber having a staple length not greater than about 1μ and a ratio of length to diameter in the range of from about 5 to about 1000, said fiber being present in a concentration in the range of from about 1 to about 60 weight percent;
(b) glass flakes having an average diameter in the range of from about 100 to about 1000μ, an average thickness in the range of from about 0.1 to about 10μ and a diameter/thickness ratio in the range of from about 4 to 400, said glass flakes being present in a concentration in the range of from about 1 to about 59 weight percent; and
(c) a polycarbonate in a concentration in the range of from about 1 to about 50 weight percent,
all based on the total quantity of the resin composition.

10. A thermoplastic resin composition as claimed in claim 9, wherein said resin component is a mixture consisting essentially of about 95 to about 60 weight percent of said polybutylene terephthalate and correspondingly, about 5 to about 40 weight percent of a polyacrylate resin.

11. A thermoplastic resin composition as claimed in claim 9, wherein said resin component is a mixture consisting essentially of about 95 to about 60 weight percent of said polybutylene terephthalate and correspondingly, about 5 to about 40 weight percent of a segment type copolyester resin.

12. A thermoplastic resin composition as claimed in claim 1, in which said reinforcing fiber is a fiber selected from the group consisting of glass, carbon, graphite, metals, silicon carbide, asbestos, wollastonite, potassium titanate and organic fibers.

13. A thermoplastic resin composition as claimed in claim 1, in which said reinforcing fiber is glass fiber and said flaky filler comprises glass flake.

14. A thermoplastic resin composition as claimed in claim 3, wherein said flaky filler is present in a concentration of from about 2 to about 40 weight percent.

15. A thermoplastic resin composition as claimed in claim 3, wherein said polycarbonate is present in a concentration of from about 2 to about 25 weight percent.

16. A thermoplastic resin composition as claimed in claim 4, wherein said polycarbonate is present in a concentration of from about 2 to about 25 weight percent.

* * * * *